Patented Oct. 23, 1951

2,572,251

UNITED STATES PATENT OFFICE 2,572,251

HYDROLYSIS OF HYDROCARBON HALIDES

Aldo De Benedictis, Berkeley, Seaver A. Ballard, Orinda, and George W. Hearne, Lafayette, Calif., assignors to Shell Development Company, San Francisco, Calif., a corporation of Delaware No Drawing. Application October 31, 1949,
Serial No. 124,718

9 Claims. (Cl. 260—640)

This invention relates to a process for effecting the hydrolysis of halogen derivatives of higher hydrocarbons to produce corresponding hydroxyl derivatives of higher hydrocarbons, and it more particularly relates to a process for the production of higher alcohols by hydrolysis of corresponding higher hydrocarbon halides. In a more specific aspect, the present invention relates in particular to a process for the production of alkyl alcohols containing eight or more carbon atoms by hydrolysis by treatment with aqueous alkali of corresponding alkyl halides containing eight or more carbon atoms.

It is known that organic halides, especially lower alkyl halides which upon hydrolysis are converted to water-miscible or substantially water-soluble alcohols, can be converted or hydrolyzed by treatment with suitable aqueous alkalies to produce the corresponding alcohol. It has been observed that the higher organic halides, particularly higher alkyl halides which upon hydrolysis are converted to alcohols having only low or negligible solubility in water, can be converted or hydrolyzed only with difficulty, if at all, to produce even in low yields the corresponding alcohols by treatment with aqueous alkali, and that the rate of the conversion, or hydrolysis, compared to the rate of the conversion or hydrolysis of the lower organic halides which form water-miscible or substantially water-soluble alcohols, is markedly low. At the rigorous conditions of temperature and pressure which are necessary to effect in a moderate time even appreciable conversion of such higher organic halides to corresponding alcohols, it has been found that there are favored in the presence of the aqueous alkali secondary or side reactions which result in formation of undesired by-products and reduced yields, compared to the yields to be anticipated from theory, of the alcohol desired as product.

In the hydrolysis by treatment with aqueous alkalies of higher hydrocarbon halides containing upwards from six and generally at least eight carbon atoms to produce corresponding water-insoluble higher alcohols, the reaction is conducted in a liquid-liquid heterogeneous system containing as one liquid phase a substantially organic phase and as a second liquid phase a substantially aqueous phase. The substantially organic phase contains, in varying amounts depending upon the extent to which reaction has progressed in the system as a whole, the water-insoluble hydrocarbon halide, the alcohol which is the desired product and which also is water-insoluble, and water-insoluble by-products, particularly the dialkyl ether wherein the alkyl groups correspond to the alkyl group of the hydrocarbon halide reactant. The aqueous phase contains the alkali which is used to accelerate the hydrolysis reaction as well as small traces of organic materials dissolved therein from the organic liquid phase.

It has now been discovered, and the process of this invention is based in part upon the discovery that, in the hydrolysis of higher alkyl halides in such liquid-liquid heterogeneous systems, the reaction or reactions which favor the formation of the water-insoluble alcohol desired as the product take place substantially in the aqueous alkaline phase, despite the substantial insolubility therein of the alkyl halide and the alcohol product, and further, that the reaction or reactions leading predominantly to undesired higher dialkyl ether which is produced as a by-product occur substantially in the non-aqueous or organic phase, despite the substantial insolubility therein of the alkali present in the system. The separate occurrence in the different liquid phases of the reactions which lead to, respectively, desired product and undesired by-product, is a distinctive feature of the process for the hydrolysis by treatment with aqueous alkali of higher alkyl halides to produce corresponding water-insoluble higher alcohols. For example, it will not be found in processes for the production of water-miscible alcohols by hydrolysis of corresponding lower alkyl halides, such as methyl and ethyl halides, nor in processes for the hydrolysis of alkyl halides to alcohols conducted in the homogeneous medium of a mutual solvent for the other components of the reaction mixture.

In accordance with the present invention, the rate of formation of undesired by-products, especially ethers, in the hydrolysis with aqueous alkalies of higher alkyl halides to produce corresponding water-insoluble higher alcohols, is controlled or reduced substantially by deliberately providing in the reaction mixture and maintaining as a component of the reaction mixture an inert, water-immiscible organic solvent in an amount sufficient to materially reduce the rate of formation of the higher dialkyl ether. The presence of the inert water-immiscible organic solvent in general has little or no retarding action upon the rate of the reaction or reactions by which the water-insoluble alcohol desired as a product is obtained and it even may increase such rate of conversion. In any given case, by increasing the amount of water present in the system, a proportionate increase in the amount of the alcohol produced per unit of time ordinarily will be realized. By deliberately providing and maintaining in the reaction mixture such a suitable amount of an inert water-immiscible organic solvent, and by further operating at high ratios of volume of aqueous phase to volume of organic phase, there are obtained, compared to operations otherwise conducted, optimum yields of the alcohol desired as the product and minimal formation of undesired ethers formed as by-products.

The following examples will illustrate certain of the many specific embodiments of the invention. It will be realized that the invention is susceptible to application in a variety of ways other than those specifically illustrated and, accordingly, that the examples are presented as illustrations of rather than limitations upon the invention as it is more broadly defined in the appended claims.

*Example I*

In this example, which comprises two experiments, there are illustrated the beneficial effects that are obtained by conducting the hydrolysis of higher alkyl halides to produce higher alkyl alcohols in the presence of an inert water-immiscible organic solvent, e. g., a hydrocarbon solvent deliberately provided and maintained in the reaction mixture. The experiments were conducted in a steel autoclave provided with a power-driven propeller-type stirrer to agitate the contents, interiorly-located heating (steam) coils, and externally-located electric heaters. The materials to be employed in each experiment were charged to the autoclave in the cold, the autoclave closed and rapidly heated to the reaction temperature. At the end of the reaction period, the autoclave was cooled rapidly, the contents filtered, the phases separated by stratification and the organic layer fractionally distilled. During the heating and reaction periods, the contents of the autoclave were vigorously stirred.

In the first of the two experiments, there were charged into the autoclave 669 grams of a long-chain alkyl halide (n-octyl bromide) and a slurry of 142 grams of calcium hydroxide (10% excess over theory) in 2998 grams of water. The mixture was heated with agitation at 200–207° C. for two hours, at a maximum pressure of 270 pounds per square inch (gauge). By cooling the resulting mixture and fractionating the separated organic phase there were recovered from the product 312 grams of the long-chain corresponding alcohol (n-octyl alcohol) and 95 grams of ether (di-n-octyl ether), corresponding to a 69% conversion of the long-chain alkyl halide to alcohol and a 23% conversion to ether. A small amount of unreacted alkyl bromide also was recovered.

In the second of the two experiments, the charge to the autoclave was a further 569 grams of the same long-chain alkyl halide, 73 grams of mixed octanes (d.=.71), and a slurry of 119 grams of calcium hydroxide (10% excess over theory) in 3003 grams of water. After heating with agitation at 199–212° C. for two hours, the products were separated as in the first of the two experiments. In addition to the octanes and a small amount of unreacted alkyl halide there were obtained 296 grams of the alcohol and 56 grams of the ether. Taking into account the amount of alkyl halide supplied to the experiment, the presence of 20% by volume of mixed octanes based upon the alkyl halide supplied, thus reduced the conversion of the alkyl halide to ether by 30% of the amount observed in the first of the two experiments.

*Example II*

As a further illustration of the invention the second of the two experiments described in Example I was repeated, with the following charge to the autoclave: long-chain alkyl halide (n-octyl bromide), 339 grams; slurry of 71 grams of lime in 3000 grams of water; 216 grams of mixed octanes (d.=.71). The products, when separated as in the foregoing example, were found to contain 199 grams of the desired long-chain alkyl alcohol (n-octyl alcohol) and only 12 grams of the corresponding ether. Taking into consideration the amount of alkyl halide charged to the autoclave, the formation of ether thus was reduced by the mixed octanes, present in an amount equal to that of the higher alkyl halide supplied, to only 25% of that observed in the absence of the inert organic solvent. Further, the conversion of the long-chain alkyl halide to desired long-chain alkyl alcohol was increased from the 77% observed in the first experiment in Example I up to 87% of theory.

It will be appreciated that the method of the present invention, which is directed particularly to selectively controlling the rates of the reactions occurring in the reaction system, is readily distinguishable from known processes wherein the amount of undesired by-product formed in attaining equilibrium conditions is reduced by initially adding the undesired by-product to the system, i. e., by control in accordance with the law of mass action of equilibria which come to exist in the system. It often is desired for technical reasons to conduct a process, for example, a continuous process, in such a manner that the reaction times are less than permit the establishment of equilibrium conditions. Although the examples described hereinbefore were conducted batchwise, the presence in each case of unreacted alkyl halide shows that the reaction was terminated prior to completion. The presence of the inert organic solvent, by selectively reducing the rate of formation of undesired ether in accordance with the principles hereinbefore outlined, and by even increasing the rate of conversion of the long-chain alkyl halide to the desired long-chain alkyl alcohol, obviates any necessity of carrying the process to equilibrium conditions, and at the same time affords high yields of and conversions to desired product.

The inert organic solvents which are particularly useful in accordance with the invention are water-insoluble or substantially water-insoluble, non-polar, inert organic solvents, preferably hydrocarbons, such as paraffin solvents, aromatic hydrocarbon solvents, or even unsaturated aliphatic hydrocarbon solvents, such as olefinic solvents. Pure hydrocarbons, or mixtures of hydrocarbons, may be employed. Aliphatic hydrocarbons containing from six to eighteen carbon atoms, preferably from six to twelve carbon atoms, are particularly suitable. Suitable mixtures of hydrocarbons obtained or derived from petroleum or like sources may be used. Halogen-substituted hydrocarbons, e. g., secondary alkyl halides, may also be used. These halogen-substituted hydrocarbons, if affected under the conditions of the process, tend to form olefins, from which the desired primary alcohol may be separated. Suitable olefins per se may be used as the inert organic solvent. Although the amount of the inert organic solvent may be, as shown in one of the examples, as little as 20% by volume of the higher alkyl halide supplied, substantially better results are obtained when the amount of the solvent is at least 70% by volume of the amount of the alkyl halide. The maximum amount of the inert solvent is not known to be critical, provided, of course, that the amount is kept within reason. In general, it will not be necessary to employ more solvent than about 20 times the volume of the higher alkyl halide supplied, maximum amounts not over about 5 times the volume of the higher alkyl halide being preferred.

The hydrolysis of the long-chain alkyl halide may be conducted at any suitable temperature that is commensurate with an adequate rate of reaction to produce the desired product. We have found that temperatures above about 120° C. are especially suitable, and that temperatures above about 170° C. are preferable since not only are higher rates of reaction obtained at the higher temperatures but, other conditions being equal, higher yields of the desired alcohol also result. Temperatures of from about 120° C. to about 275° C. form a broad range while temperatures of from about 170° C. to about 235° C. form a preferred range. Alkalies suitable for effecting the reaction are in general those alkalies known by those skilled in the art as being suitable for effecting hydrolysis in the presence of water of the lower alkyl halides, e. g., the chlorides and bromides of ethyl and methyl, to produce the water-soluble corresponding alcohols. There come into consideration the alkali metal hydroxides and carbonates, particularly the hydroxides and the carbonates of sodium and of potassium, as well as the alkaline earth metal hydroxides, especially calcium hydroxide. The alkali desirably is employed in moderate excess, generally from about 1% to about 50% over the amount theoretically required to react with the alkyl halide. The water-soluble alkalies, e. g., sodium hydroxide, may be used in the form of aqueous solutions of concentration preferably from about 2% to about 15% by weight. Less soluble alkalies, e. g., the alkaline earth metal hydroxides, such as lime, may be used as a slurry of the alkali in water. The process may be conducted continuously, intermittently or in a batchwise manner, the improved process being especially adapted to continuous operations. After recovery or separation of the desired long-chain alcohol (for example, by fractional distillation of the separated, washed organic phase of the reaction mixture), the inert organic solvent, with or without prior separation therefrom of any unreacted halide or of by-products formed in the process, may be recycled.

While the invention has been illustrated with particular reference to octyl bromide as the long-chain alkyl halide, the method of the invention is generally applicable to the hydrolysis of higher alkyl halides which form upon hydrolysis corresponding substantially water-insoluble alcohols. In general, such alkyl halides contain eight or more carbon atoms and preferably are primary alkyl halides. Suitable alkyl halides which may be hydrolyzed with the advantages described herein according to the method of the invention include, in addition to n-octyl bromide, the following: n-nonyl bromide, n-decyl bromide, n-undecyl bromide, n-dodecyl bromide, n-tridecyl bromide, n-tetradecyl bromide, n-pentadecyl bromide, n-hexadecyl bromide, n-heptadecyl bromide, n-octadecyl bromide. Branched-chain analogs of those specifically named may be used. Polyhalogen-substituted hydrocarbons may be employed, one or more than one of the atoms of halogen being removed in the hydrolysis depending upon the conditions used. Although particular reference has been made to the bromides, corresponding long-chain alkyl chlorides and even alkyl iodides may be used. The long-chain alkyl halides, in the hydrolysis of which the improvement of this invention is applicable, thus are those in which the halogen is a halogen having an atomic number not less than 17 and not greater than 53.

It will be appreciated that the invention is susceptible to many modifications by those skilled in the art and, accordingly, that the invention is intended to be regarded as broadly as the prior art permits with reference to the claims appended hereto.

We claim as our invention:

1. A process for effecting the hydrolysis of a saturated aliphatic hydrocabron halide containing at least eight carbon atoms per molecule wherein the halogen is a halogen having an atomic number not less than 17 and not greater than 53 to produce a corresponding alcohol containing at least eight carbon atoms per molecule, which comprises heating said hydrocarbon halide in heterogeneous liquid-phase mixture with an aqueous alkaline solution and repressing the rate of formation of ether by-products by the deliberate inclusion in the reaction mixture of a water-immiscible hydrocarbon solvent.

2. In a process for the preparation of a substantialy water-insoluble primary alcohol by hydrolysis of a corresponding substantially water-insoluble primary alkyl halide wherein the halogen is a halogen having an atomic number not less than 17 and not greater than 53, in which process the hydrolysis is conducted by treatment of said substantially water-insoluble alkyl halide with an alkaline aqueous solution in a liquid-liquid heterogeneous reaction mixture comprising a predominantly organic-material liquid phase and a second, aqueous liquid phase containing a mineral alkali, the steps which comprise deliberately providing in the reacting mixture a water-immiscible hydrocarbon solvent and maintaining said water-immiscible hydrocarbon solvent in the reaction mixture during reaction, whereby the rate of formation of undesired ethers which are normally formed as undesired by-products is repressed and the yield of desired alcohol is enhanced.

3. A process for the manufacture of alcohols containing at least eight carbon atoms per molecule by effecting hydrolysis of saturated aliphatic hydrocarbon halides containing at least eight carbon atoms per molecule wherein the halogen is a halogen having an atomic number not less than 17 and not greater than 53, which process comprises forming a heterogeneous mixture comprising a water-immiscible hydrocarbon solvent, a saturated aliphatic hydrocarbon halide containing at least eight carbon atoms per molecule wherein the halogen is a halogen having an atomic number not less than 17 and not greater than 53, and an aqueous alkali solution, and heating the mixture to effect hydrolysis in liquid phase of said hydrocarbon halide to a corresponding alcohol while maintaining the water-immiscible hydrocarbon solvent in the mixture, whereby the rate of formation of ethers formed as by-products is repressed and the yield of desired alcohol is enhanced.

4. In a process for effecting the hydrolysis in liquid phase of a long-chain alkyl halide containing at least eight carbon atoms wherein the halogen is a halogen having an atomic number not less than 17 and not greater than 53 to produce a corresponding long-chain alkyl alcohol by treatment of said long-chain alkyl halide with an aqueous alkaline solution under superatmospheric pressure and at an elevated effective temperature, corresponding long-chain dialkyl ether tending to be produced as a by-product, decreasing the rate of formation of said dialkyl ether by conducting the reaction in the presence of a water-insoluble hydrocarbon solvent deliberately incorporated in the reaction mixture and maintained therein during reaction.

5. A process for effecting the hydrolysis of an octyl halide wherein the halogen is a halogen having an atomic number not less than 17 and not greater than 53 to produce an octyl alcohol which comprises heating an octyl halide wherein the halogen is a halogen having an atomic number not less than 17 and not greater than 53 in heterogeneous liquid-phase mixture with an aqueous alkali solution and repressing the rate of formation of dioctyl ether by the deliberate inclusion in the reaction mixture of a water-immiscible hydrocarbon solvent.

6. In a liquid-phase process for effecting the hydrolysis of long-chain alkyl bromides to produce corresponding water-insoluble long-chain alkyl alcohols, the reaction system comprising an aqueous phase comprising an aqueous solution of a mineral alkali and a substantially water-insoluble organic-material phase comprising initially long-chain alkyl bromide, the steps which consist in deliberately providing in the reaction mixture a water-immiscible hydrocarbon solvent and maintaining said water-immiscible hydrocarbon solvent in the reaction mixture during reaction, whereby the rate of formation of undesired long-chain dialkyl ethers which are normally formed as undesired by-products is repressed and the yield of desired long-chain alkyl alcohols is enhanced.

7. In a process for the production of water-insoluble alkyl alcohols containing from eight to twelve carbon atoms by liquid-phase hydrolysis of primary alkyl halides containing from eight to twelve carbon atoms per molecule wherein the halogen is a halogen having an atomic number not less than 17 and not greater than 53 in a liquid-liquid heterogeneous system comprising as one phase an aqueous solution of a mineral alkali, the steps which consist in mixing primary alkyl halides containing from eight to twelve carbon atoms per molecule wherein the halogen is a halogen having an atomic number not less than 17 and not greater than 53, a water-immiscible hydrocarbon solvent in an amount at least about 70% by volume of the said alkyl halides, and an aqueous dispersion of a strong mineral alkali, and heating the mixture to effect hydrolysis of the alkyl halides containing from eight to twelve carbon atoms to produce the corresponding primary alkyl alcohols containing from eight to twelve carbon atoms per molecule.

8. In a liquid-phase process for effecting the hydrolysis of n-octyl bromide to produce n-octyl alcohol by heating of n-octyl bromide under superatmospheric pressure in a heterogeneous liquid phase system comprising a predominantly organic-material liquid phase and a second, aqueous liquid phase containing a mineral alkali, the steps which consist in deliberately incorporating a water-immiscible hydrocarbon solvent in the reaction mixture and maintaining said water-immiscible hydrocarbon solvent in the reaction mixture during reaction.

9. In a liquid-phase process for effecting the hydrolysis of n-octyl bromide to produce n-octyl alcohol by treatment of n-octyl bromide under superatmospheric pressure at about 200° C. in a heterogeneous liquid-phase system comprising a predominantly organic-material liquid phase and a second, aqueous liquid phase containing a mineral alkali, the steps which consist in deliberately incorporating a mixture of octanes in said heterogeneous liquid-phase system prior to reaction and maintaining said mixture of octanes in the system during reaction.

ALDO DE BENEDICTIS.
SEAVER A. BALLARD.
GEORGE W. HEARNE.

REFERENCES CITED

The following references are of record in the file of this patent:

UNITED STATES PATENTS

| Number | Name | Date |
|---|---|---|
| 1,984,334 | Clark et al. | Dec. 11, 1934 |